United States Patent [19]

Lifshits et al.

[11] 4,012,619

[45] Mar. 15, 1977

[54] MACHINE FOR THE RESISTANCE BUTT WELDING OF PIPES BY FUSION

[76] Inventors: Viktor Senderovich Lifshits, Kavkazsky bulvar, 21, korpus 2, kv. 41, Moscow; Vladimir Nikitich Baranov, Elektrostal, prospekt Lenina, 30/13, kv. 16, Moskovsakaya oblast; Llonid Pavlovich Shklyanov, Elektrostal, ulitsa Zhulyabina, 8, kv. 14, Moskovskaya oblast; Olimpiada Mikhailovna Brjukvina, Elektrostal, ulitsa Elagina, 14, kv. 85, Moskovskaya oblast; Tamila Iosifovna Osinskaya, Elektrostal, ulitsa Zhulyabina, 3, kv. 91, Moskovskaya oblast; Nikolai Makarovich Dergachev, Elektrostal, prospekt Juzhny, 17, korpus 1, kv. 178, Moskovskaya oblast; Arkady Alexeevich Pevnev, Elektrostal, ulitsa Oktyabrskaya, 13, kv. 44, Moskovskaya oblast; Georgy Nikolaevich Petrov, Izmailovsky bulvar, 34/32, kv. 8, Moscow; Oleg Sergeevich Papkov, Samarkandsky bulvar, 24, korpus 3, kv. 3, Moscow; Vladimir Ivanovich Khomenko, ulitsa Miklukho-Maklaya, 33, korpus 2, kv. 372, Moscow, all of U.S.S.R.

[22] Filed: June 6, 1975

[21] Appl. No.: 584,494

[52] U.S. Cl. .................................. 219/101; 219/59; 219/160; 219/161; 228/44.5; 279/2 R
[51] Int. Cl.² ........................................ B23K 11/04
[58] Field of Search ............ 228/44.5; 219/59, 101, 219/160, 161; 279/2

[56] References Cited

UNITED STATES PATENTS

| 2,777,048 | 1/1957 | Kocks | 219/161 |
| 3,164,712 | 1/1965 | Paton et al. | 219/101 |
| 3,697,720 | 10/1972 | Christopher | 219/161 X |
| 3,732,391 | 5/1973 | La Force et al. | 219/161 X |
| 3,882,299 | 5/1975 | Sciaky | 219/101 X |

*Primary Examiner*—J. V. Truhe
*Assistant Examiner*—N. D. Herkamp
*Attorney, Agent, or Firm*—Haseltine, Lake & Waters

[57] ABSTRACT

The machine disclosed is provided with a manipulator which aligns and moves pipes in course of welding and incorporates a hollow rod for the movement of the manipulator relatively to the pipe joints. The rod is immovably attached to the body of the manipulator and is provided with a partition subdividing the rod bore into two spaces. One of the spaces is intended to be filled with a working fluid and the other accommodates on the partition a hydraulic system for feeding and controlling both actuators of pipeholding clamps and a means for moving the pipes in the course of welding, the means comprising hydraulic cylinders whose bodies are immovably attached to the body of a movable aligning unit between hydraulic cylinders which are mounted on the unit to actuate the clamps holding fast one of the pipes being welded whereas piston rods of the hydraulic cylinders that move the pipes are immovably attached to the body of the manipulator insulated electrically from an immovable aligning unit.

It is expedient to use the machine disclosed for welding bigbore pipes into a continuous pipeline.

The layout of said machine provides for quick withdrawal and replacement of hydraulic actuating cylinders without taking apart the welding manipulator. This feature adds to the number of purposes the machine can serve, promotes its serviceability and repairability.

2 Claims, 2 Drawing Figures

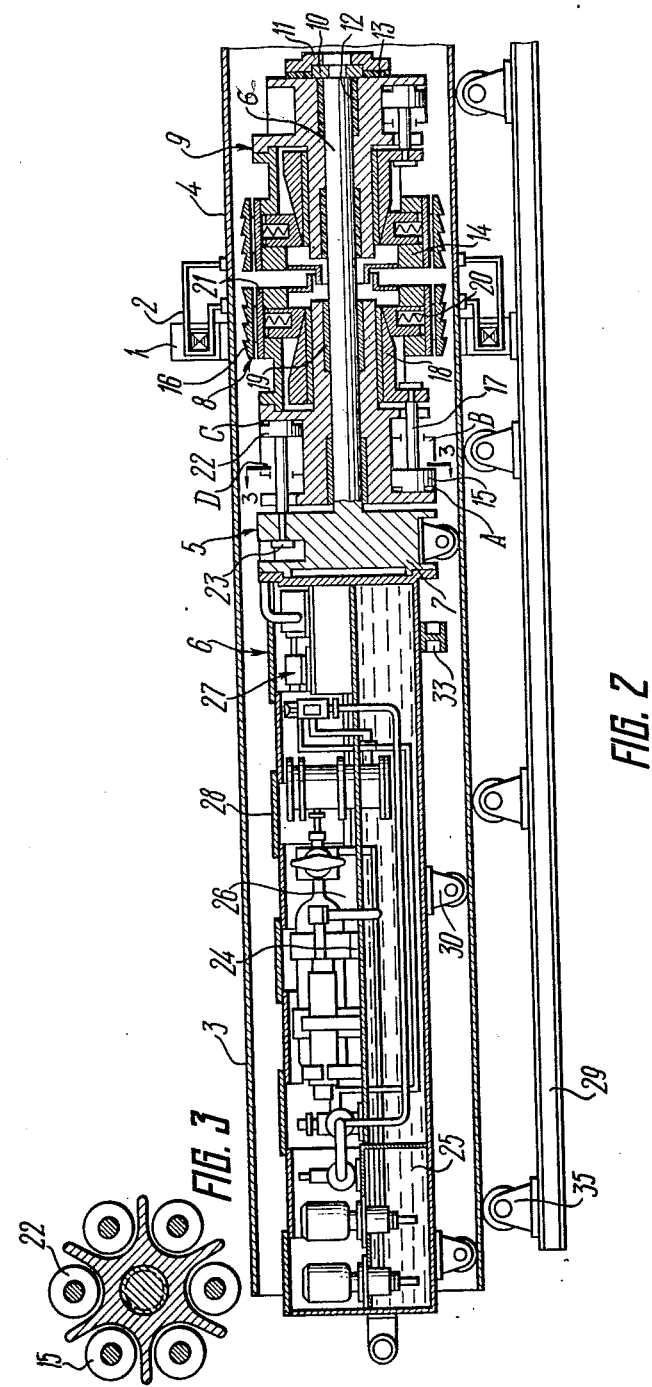

MACHINE FOR THE RESISTANCE BUTT WELDING OF PIPES BY FUSION

The invention relates to apparatus for the welding of hollow elongated products, and more specifically to machines for the resistance butt welding of pipes by fusion.

The field of the preferred application of the invention is the welding of large-bore pipes where the invention may be employed either in the form of a movable machine for welding individual pipes into a continuous string directly on the site of laying a pipeline, or in the form of stationary equipment of a field plant located close to the site to supply extended pipe lengths.

There are known in the art machines for the resistance butt welding of pipelines which are used only for the welding of individual pipes into a continuous string. Also known is resistance welding equipment finding application only as a means of joining individual pipes into extended pipe lengths at field plants.

Further known is a machine for the resistance butt welding of pipes by fusion comprising a welding transformer with current leads, the transformer embracing the pipes welded from the outside, and a manipulator disposed inside the pipes for the purpose of aligning and moving the same in the course of welding, the manipulator incorporating aligning units — one moving relatively to the manipulator body and the other not — with radially disposed clamps holding fast the pipes to be welded and hydraulic cylinders actuating the pipe clamps. There is a rod for moving the manipulator with respect to the welded joints of pipes, and a hydraulic system for feeding and controlling the clamps of the pipes as well as a means of moving the pipes in course of welding.

In the known machine, the hydraulic system is located outside the pipes, is bulky and exceeds in its size the inside diameter of the pipes. If the known machine is used for welding individual pipes into a continuous pipeline in the field, the hydraulic system must be disconnected on welding a joint from the manipulator disposed inside the pipe, hauled to the next joint and again connected to the manipulator to perform the next welding cycle. Since all the operations involved are arduous and labour-consuming, practically it is expedient to employ the known machine as a stationary equipment for welding individual pipes into extended pipe lengths.

Another disadvantage of the known machine is the difficulty experienced in repairing the machine and rendering it serviceable. The point is that the manipulator body itself performs the function of the piston rods of the hydraulic cylinders actuating the clamps holding fast the pipes being welded. In this case, the breakdown even of a single hydraulic cylinder actuating a pipe-holding clamp calls for its repair in situ, entailing complete disassembly of the manipulator or the replacement of at least one of the aligning units. Since the repair of a hydraulic system in situ, particularly in the field, poses numerous difficulties and is undesirable, the only way out is to replace an entire portion of the machine wherein most of the components retain their serviceability.

The main object of the present invention is to provide a machine for the resistance butt welding of pipes constructed so that it can be easily employed not only as a stationary facility but also as a movable one, adapted to cope with the welding of individual pipes into a continuous pipeline directly in the field.

Another object of the present invention is to provide a machine for resistance butt welding, of a layout which ensures rapid withdrawal of the hydraulic actuating cylinders and their replacement by spare ones in the field without taking apart the welding manipulator.

These and other objects of the present invention are attained in that the machine comprises a welding transformer with current leads, the transformer embracing the workpieces or pipes to be welded from the outside, and a manipulator disposed inside the pipes for the purpose of aligning and moving the pipes in the course of welding. The manipulator incorporates aligning units — one movable and the other immovable with respect to the manipulator body — with clamps radially disposed therein to hold fast the pipes and with hydraulic cylinders actuating the pipe clamps, a rod for moving the manipulator with respect to the pipe joints, and a hydraulic system serving the purpose of feeding and controlling the actuators of the clamps as well as a means for moving the pipes in the course of welding.

According to the invention, the rod is immovably attached to the body of the manipulator, is made hollow and is provided with a partition subdividing the bore of the rod longitudinally into two spaces. One of the spaces is intended to be filled with a working fluid and the other accommodates on the partition the hydraulic system.

The moving means includes at least one hydraulic cylinder, whose bodies are immovably attached to the body of the movable aligning unit between the hydraulic cylinders that are mounted thereon and actuate the clamps, whereas the piston rods of the hydraulic cylinders which move the pipes in the course of welding are immovably attached to the manipulator body, insulated electrically from the immovable aligning unit.

By virtue of the fact that the rod is immovably attached to the body of the manipulator, is made hollow and is subdivided longitudinally by the partition into two spaces, there is a possibility to fill the lower space with a working fluid and to accommodate in the upper the hydraulic system for feeding and controlling the actuators of the clamps holding fast the pipes and the means of moving the pipes in course of welding.

Since the means of moving the pipes in the course of welding consists of a number of hydraulic cylinders whose bodies are immovably attached to the body of the movable aligning unit between the hydraulic cylinders which are mounted thereon and actuate the clamps, there is a possibility to unitize the hydraulic cylinders moving the pipes with those holding these fast, on the one hand, and to create conditions enabling a rapid removal of any of the hydraulic cylinders, on the other hand, in the event of a breakdown and the replacement of it by a spare cylinder.

It is expedient that the body of each aligning unit is given the form of a cylinder placed inside another cylinder, the cylinders being interconnected at the end faces, and that the hydraulic cylinders actuating the clamps of the pipes are attached to the outside cylinders, whereas there is a cone mounted on the inside cylinder with provision for travel along its axis, which cone is rigidly attached to the piston rods of the hydraulic cylinders and interacts with the pipe clamps receiving support therefrom. Owing to the arrangement of the aligning unit, the reliability of the manipulator is enhanced and the movable aligning unit can be unitized with its immovable counterpart so that the repairability of the manipulator in field is promoted.

The present invention will be best understood from the following detailed description of a preferred embodiment of the invention when this description is being read in conjunction with the accompanying drawings in which:

FIG. 2 is a general view of the same machine adapted for welding either individual pipes or extended pipe lengths into a continuous pipeline; and FIG. 3 is a section on line 3—3 of FIGS. 1 and 2.

Figure 1:
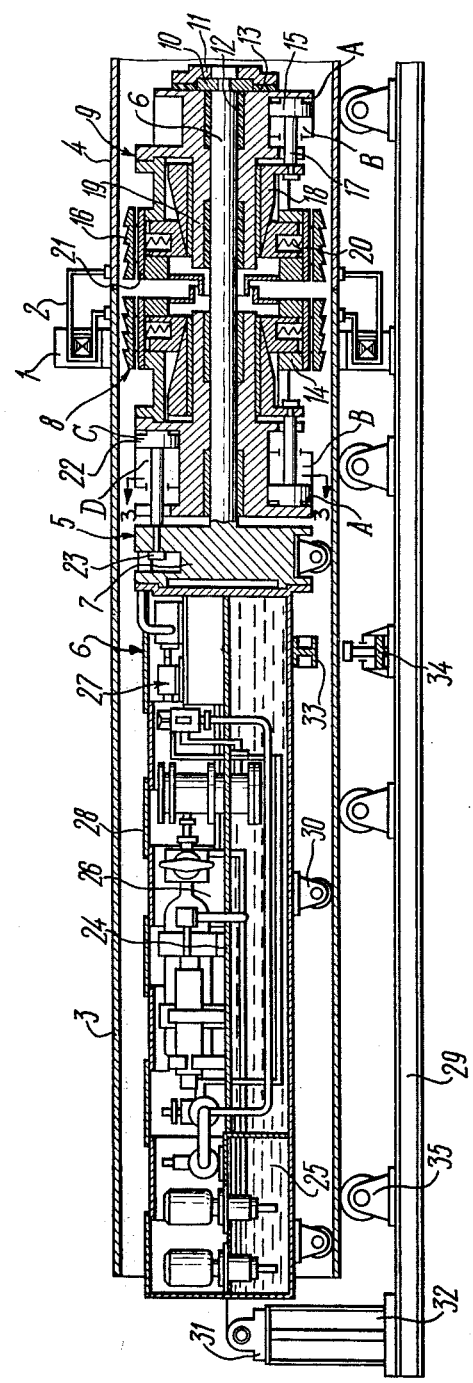
FIG. 1 is a general view of an exemplary machine for the resistance butt welding of pipes according to the invention, used as a stationary equipment for welding individual pipes into extended pipe lengths.

The machine for the resistance butt welding of pipes disclosed comprises a welding transformer 1 (FIG. 1) with current leads 2 attached thereto, the transformer embracing pipes 3 and 4 that are to be welded from the outside, and a manipulator 5 disposed inside the pipes 3 and 4. The welding manipulator 5 incorporates a rod 6 immovably attached to a body 7 of the manipulator 5, whereon are disposed an aligning unit 8 and an aligning unit 9 which are made movable and immovable, respectively, relative to the manipulator body 7 and serve to hold fast the pipes 3 and 4 to be welded.

The immovable aligning unit 9 is secured to the body 7 of the manipulator 5 by means of two ring halves 10 and an end plate 11. The manipulator body 7 is electrically insulated from the aligning unit 9 by sleeves 12 and a washer 13. Attached to outside cylinders 14 of the bodies of the aligning units 8 and 9 are hydraulic cylinders 15 with actuating clamps 16 which hold fast the pipes 3 and 4.

Piston rods 17 of the hydraulic cylinders 15 are connected to cones 18 mounted on inside cylinders 19 of the bodies of the aligning units 8 and 9 with provision for travel along their axes. The side surfaces of the cones 18 provide support for the clamps 16, capable of moving in radial grooves of the outside cylinders 14 of the bodies of the aligning units 8 and 9. The number of the clamps 16 provided in the aligning units 8 and 9 depends on the diameter of the pipes to be welded. The clamps 16 are pressed against the side surfaces of the cones 18 by the action of return springs 20 disposed in longitudinal grooves. Each of the return springs 20 abuts the bottom of the corresponding clamp 16 with one of its ends and a bar 21 with the other end, the bar being disposed in a transverse groove of the clamp 16 and rigidly attached to the outside cylinders 14 forming the bodies of the aligning units 8 and 9.

The movable aligning unit 8 is displaced relative to the manipulator body 7 with the aid of a means for moving the pipes in the course of welding, which is a mechanism made up of a number of hydraulic cylinders 22 whose bodies are immovably attached to the outside cylinder 14 of the body of the movable aligning unit 8 between the hydraulic cylinders 15 actuating the clamps 16 holding fast the pipe 3, whereas the piston rods 23 of the hydraulic cylinders 22 are immovably attached to the body 7 of the manipulator 5. The rod 6 serving to move the manipulator 5 with respect to the pipes 3 and 4 welded is immovably attached to the body 7.

The rod 6 is made hollow and fitted with a partition 24 subdividing longitudinally the rod bore into two spaces. Wile the lower space 25 of the rod 6 serves as a reservoir for the fluid used in the hydraulic system of the manipulator 5, the upper space 26 of the rod 6 accommodates on the partition 24 a hyraulic system 27 which serves the purpose of feeding and controlling the hydraulic cylinders 15 actuating the clamps 16 of the pipes 3 and 4 and also the hydraulic cylinders 22 moving the pipes 3 and 4 in the course of welding. Hinged cover plates 28 are fitted to the rod 6 to prevent foreign articles and sludge from entering the hydraulic system 27.

The external items of the welding machine, i.e., the transformer 1 and the current leads 2, are secured to a roll table 29 which, depending on the conditions, is either placed on the ground if the machine is used as a stationary plant or is suspended from a pipe-laying boom or any other handling means if the machine is employed in its movable application. It will be clear from the subsequently presented operational description that the resistance butt weld is performed by the application of an appropriate current, derived from the transformer 1, and brought to the respective pipe ends 3, 4 by way of the current leads 2, as can be seen in FIGS. 1 and 2. The pipe ends can be seen intermediate the attaching points of the leads 2 (by way of the oppositely applied hatching of the pipes 3 and 4). The mains input wires of the transformer have been omitted. The manipulator 5 is provided with several pairs of wheels 30 which rest on the pipes 3 and 4 and serve to move the manipulator 5 relative to the pipes. The wheels 30 in each pair are arranged one with respect to the other so as to form an angle of 60°–90°.

When operating under stationary conditions for joining individual pipes into extended pipe lengths as shown in FIG. 1, the manipulator 5 is secured with one of its ends in a bearing 31 resting on a bracket 32 which is held fast to the roll table 29. The other point of support for the manipulator 5 is provided in the form of a plate 33 which is fitted to the rod 6 of the manipulator 5 and abuts against a jack 34 if the pipe 3 is absent. In a stationary application of the welding machine, the pipes are moved relative to the manipulator 5 by means of rollers 35 of the roll table 29, these rollers obtaining motion from a conventional drive (not shown in FIG. 1).

In case the welding machine is employed for joining pipes into a continuous pipeline as shown in FIG. 2, the manipulator 5 can be moved from joint to joint by various means as, for example, a tractor (not shown) hitched to the rod 6 or the power-driven wheels 30.

The machine operates on the following lines. Before welding is started, the aligning units 8 and 9 are set apart as far as possible. For welding under stationary conditions (see FIG. 1), the pipe 3 is fed by the rollers 35 of the roll table 29 towards the manipulator 5 until it reaches the jack 34. At this instant the jack 34 is lowered and the manipulator 5 enters the pipe 3 with its front wheels 30 and then the travel of the pipe 3 down the roll table 29 towards the bracket 32 is resumed, continuing until the right-hand end face of the pipe, as shown in the drawing, is midway between the aligning units 8 and 9.

At this stage, the clamps 16 of the aligning unit 8 are applied to the pipe 3 by admitting working fluid into the spaces A of the hydraulic cylinders 15 of the aligning unit 8 whereas the fluid contained in the spaces B of said cylinders is drained into the lower space 25 of the rod 6. As a result, the cone 18 connected to the piston rods 17 of the hydraulic cylinders 15 moves in the aligning unit 8 to the left according to the drawing, so that its side surface forces the clamps 16 of the aligning unit 8 apart, this action applying the clamps to the pipe 3 which is consequently held fast. Next, the pipe 4 is placed on the roll table 29 and fed by the rollers 35 into a position where it contacts the pipe 3 and must be clamped by the clamps 16 of the aligning unit 9.

To that end, working fluid is admitted into the spaces A of the hydraulic cylinders 15 of the aligning unit 9 whereas the fluid contained in the spaces B of said cylinders is drained into the space 25. As a result, the cone 18 of the aligning unit 9 connected to the piston rods 17 of the hydraulic cylinders 15 moves in the aligning unit 9 to the left according to the drawing so that its side surface forces the clamps 16 of the aligning unit 9 apart, this action applying the clamps to the pipe 4 which is consequently held fast.

Since the aligning units 8 and 9 are of the same size and are accommodated on the same body 7, the clamping of the pipes 3 and 4 brings the pipes into alignment one with the other. Once the pipes are clamped, the current leads 2 from the welding transformer 1 are applied to the pipes and the current is cut in. After that, working fluid is admitted into the spaces C of the hydraulic cylinders 22 according to a special programme, using the system 27 of feeding and control, whereas the fluid contained in the spaces D is drained into the lower space 25 of the rod 6. This causes the bodies of the hydraulic cylinders 22 to start moving integrally with the aligning unit 8 and the pipe 3 so as to enable the process of resistance butt welding by fusion to take place.

On completing the process of welding finished by upsetting, working fluid is admitted into the spaces B of the hydraulic cylinders 15 of the aligning units 8 and 9 whereas the fluid contained in the spaces A of the cylinders is drained into the space 25 of the rod 6. The distance between the cones 18 of the aligning units 8 and 9 consequently increases and the clamps 16 of the aligning units 8 and 9 move inwardly towards the axis of the body 7 of the manipulator 5 under the action of the springs 20, releasing thus the hold on the pipes 3 and 4 welded. On removing the current leads 2 of the welding transformer 1 from the pipes 3 and 4 welded, fluid is admitted into the spaces D of the hydraulic cylinders 22 whereas the fluid contained in the spaces C of said cylinders is drained into the space 25.

This causes the aligning units 8 and 9 to move apart and the pipes 3 and 4 welded, which are in fact a double-length section, are carried by the rollers 35 of the roll table 29 to the right, leaving the welding machine. As soon as the left-hand end face of the double-length pipe section passes the jack 34 on its way to the right, the jack is lifted, giving support to the manipulator 5 which rests thereupon with the plate 33. The double-length pipe section continues its rightward travel, giving way to the next pair of pipes, and the welding cycle is then repeated.

If the welding machine is used for joining individual pipes into a continuous pipeline (see FIG. 2), the welding manipulator 5 is moved by some means of handling, a tractor for example, in the pipe 4 through the intermediary of the rod 6 as far as this is necessary to place the left-hand end face of the pipe midway between the aligning units 8 and 9. The clamps 16 of the aligning unit 9 take hold of the pipe 4 in the same sequence of events as described above and then a next pipe 3 is fed onto the manipulator 5, using a pipe-laying boom, by an amount which places the pipe 3 in contact with the pipe 4.

On clamping the pipe 3 with the clamps 16 of the aligning unit 8, the roll table 29 is moved with the aid of the pipe-laying boom to the left so that the joint between the pipes 3 and 4 is midway between the current leads 2 of the transformer 1. Next, the current leads 2 are applied to the pipes 3 and 4 to be welded and the current is switched on to start the process of resistance butt welding by continuous fusion which goes on as described above.

On completing the welding, the pipes 3 and 4 are released of both the clamps 16 of the aligning units 8 and 9 and of the current leads 2. The aligning units 8 and 9 are moved apart to set the welding machine into the starting position, the welding manipulator 5 is transferred to the left-hand end face of the pipe 3, using the handling means available, and then the welding cycle is repeated.

What is claimed is:

1. A machine for flash-butt welding of pipes, comprising: a welding transformer (1) with current leads (2), embracing the pipes to be welded (3,4) from the outside, said transformer being connected with the pipes by said leads in the course of the welding; a manipulator (5) for aligning and moving the pipes, disposed inside the pipes, and including a body (7) of said manipulator; a first aligning unit (8) mounted movably with respect to said body; a second aligning unit (9) mounted immovably with respect to said body and insulated electrically from the latter; clamps (16) for the pipes, disposed in radial slots of said aligning units; hydraulic cylinders (15) for actuating said clamps, arranged on bodies of said aligning units; means for moving the pipes in the course of the welding; hydraulic cylinders (22) for said moving means, whose bodies are immovably attached to said body of the movable aligning unit between said hydraulic cylinders of the clamps of one of the types to be welded; piston rods (23) of said hydraulic cylinders of the moving means, immovably attached to said body of the manipulator; a hydraulic system (27) for feeding and controlling said hydraulic cylinders of the clamps and of the moving means; a rod (6) for moving said manipulator with respect to the pipes during auxilliary operations, said rod being immovably connected with,said body of the manipulator; and a partition (24) dividing the bore of said rod longitudinally into two spaces, one space (25) for receiving a working fluid, the other space (26) accommodating the hydraulic system on said partition, for feeding and controlling actuators of said clamps as well as said moving means.

2. The machine as defined in claim 1 wherein said aligning units (8,9) include: a body made in the form of an inner cylinder (19) placed inside an outer cylinder (14) and interconnected at the end faces; said clamps (16), having longitudinal and lateral slots, being disposed in said radial slots of the outer cylinder; a cone (18) fitted over said inner cylinder, movable along the axis thereof; return springs (20) accommodated in said longitudinal slots of the clamps and bars (21) passing through said lateral slots and secured on said outer cylinder; said hydraulic cylinders (15) of the clamps being attached with said bodies thereof on said outer cylinder, and having piston rods (17) that are linked with said cone while said clamps are pressed against the side surface of said cone by said springs whose one ends rest on the bottoms of said longitudinal slots, and the other ends thrust against said bars.

* * * * *